Patented Mar. 26, 1935

1,996,016

UNITED STATES PATENT OFFICE 1,996,016

MANUFACTURE OF CALCIUM ARSENATE INSECTICIDES

Johnson Hagood, Avenel, N. J., assignor to The American Agricultural Chemical Company, Newark, N. J., a corporation of Delaware No Drawing. Application March 22, 1933, Serial No. 662,095

7 Claims. (Cl. 167—15)

This invention relates to the manufacture of calcium arsenate insecticides, and particularly calcium arsenate products, for insecticidal and other uses, such for example as those composed essentially of tri-calcium arsenate and/or one or more basic calcium arsenates, or one or more calcium arsenates together with an excess of lime; such substances may generally be prepared by the reaction of arsenic acid and milk of lime. It is well known that in insecticides of the character stated the content of water-soluble arsenic ($As_2O_5$) must be low, in order to avoid burning of the plants to which the material is applied, and it is likewise known that in the presence of carbonic acid, or carbon dioxide, and moisture, the content of soluble arsenic increases by reason of the reaction with the $CO_2$ and consequent liberation of $As_2O_5$. Hence when the arsenate is dusted on plants the resulting thin film affords an ideal condition for reaction with the carbon dioxide of the atmosphere.

Important objects of the present invention accordingly include the provision of procedure for making materials of the class described which will be highly resistant to carbon dioxide, and which not only may have the low content of water-soluble arsenic desired for an insecticide, but will be adapted to withstand deteriorating influences of the atmosphere, thus enabling the arsenate to be used freely without danger of injury to the plants by the burning incident to increase of the soluble oxide $As_2O_5$; and it is a further object thus to provide for efficiently rendering calcium arsenates, such as described, resistant to carbon dioxide, and able to withstand atmospheric and like deteriorating influences.

An important end of my novel process, for example, is to produce an insecticide in which the calcium arsenate constituent has intimately incorporated with it a small amount of combined fluorine; it has been found that the insecticide is thereby rendered markedly stable, so that prolonged exposure to atmospheric carbon dioxide, even in damp weather, has no material effect. Thus in one case, a calcium arsenate insecticide containing only 1 per cent of fluorine increased its soluble arsenic (soluble $As_2O_5$) content from an initial value of 0.08 per cent to no more than 0.10 per cent in 114 hours exposure to pure moist $CO_2$, whereas the same material free from fluorine, under the same conditions, increased its soluble arsenic to 2.5 per cent. With numerous other batches of insecticide having a like character and containing fluorine, equally good or better results have been obtained, there being in many cases little or no perceptible increase in soluble arsenic content on long-continued exposure to pure moist $CO_2$.

Resistance to carbon dioxide, as just described, can be efficiently obtained by making the calcium arsenate product in such way that it includes combined fluorine, the arsenate and fluorine ingredients preferably having a characteristic intimate association or relationship. For good results in that and other respects, the new procedure is preferably such that completion of the arsenic is preferably such that completion of the arsenic involves some chemical reaction taking place subsequent to or not later than the introduction of a fluorine compound; it being believed that the stated intimate association of the final arsenate and fluorine ingredients can be thereby obtained. Various fluorides or fluorine-containing substances may be introduced in that manner, and the product will accordingly be stabilized for safe insecticidal use on plants; as stated, such stabilized products may be made so as to include, particularly, tri-calcium arsenate, basic calcium arsenate, tri-calcium arsenate having an excess of lime, or other like active insecticidal calcium arsenate materials having a low soluble arsenic content.

The stabilizing effect can be obtained with different amounts of fluorine, but a quantity equal to about 1.5 to 2 per cent of the total arsenate (measured as $As_2O_5$) is preferred, as this imparts effective resistance for practical use of an insecticide on plants. In calcium arsenate insecticides of the sort now made commercially, containing from 40 to 50 per cent $As_2O_5$, more or less, such quantity of fluorine is about 0.75 per cent of the whole. In certain instances, larger amounts of fluorine may be used, although in general a quantity equal to 3 or 4 per cent of the total $As_2O_5$ is enough (meaning a fluorine content of not more than 1 or 1.5 per cent of the complete commercial product), and in some cases, a larger quantity may amount to a disadvantageous diluent of the active $As_2O_5$ content of the insecticide.

A desirable way of carrying out the invention is to have a fluorine compound present, in amount sufficient to give the desired fluorine content, during a reaction which produces calcium arsenate so that the fluorine component is introduced in the course of making the arsenate. This may be conveniently done by mixing the fluorine compound with one of the ingredients employed to produce the desired arsenate, such as of the type described, and then subsequent mixing-in or other treatment of all necessary ingredients will effect the desired reaction in the presence of the fluorine compound and will result in the desired inclusion of combined fluorine in the product. For instance, satisfactory insecticides being produced by the reaction of arsenic acid and milk of lime, a small amount of a fluorine compound, such as calcium fluoride, may be introduced prior to such reaction, preferably by mixing it with the arsenic acid in water; the milk of lime is then added and stirred in, preferably at a slow rate. As will now be appreciated, the lime and arsenic acid react to provide the desired calcium arsenate, and the final product which is thus conveniently produced as a precipitate, and which may be washed and dried for use as an insecticidal dusting powder, includes calcium fluoride in the described intimate association with the arsenate. Where certain other fluorine compounds are used, for example soluble compounds such as hydrofluoric acid, further chemical reaction may take place, so that combination with the lime affords a product including calcium fluoride; at the same time, excellent stabilization of the arsenate is obtained.

The following is a specific example of the process: 1 part by weight of finely divided calcium fluoride was added to 82.5 parts by weight of arsenic acid (75% $As_2O_5$ by weight). The mixture was warmed and agitated, being raised to a temperature of 50° C. or more (about 60° C. being preferable), and 200 parts by weight of water were added. Milk of lime, consisting of about 800 parts by weight of water and 67.5 parts by weight of slaked lime, $Ca(OH)_2$, was then added, continuing the stirring or agitation and controlling the lime addition so that the temperature did not rise too rapidly. After the reaction was complete, the temperature was raised to about 75° C., and the batch was then filtered, washed and dried.

Products of this type are found to be efficiently stabilized insecticides, capable of maintaining a desirably low soluble arsenic content even on the severe test of long exposure to an atmosphere consisting of moist $CO_2$; one sample, for instance, containing 0.74% fluorine scarcely more than doubled an original content of 0.20% water-soluble $As_2O_5$, on 120 hours of such exposure, while in a comparison sample without fluorine the soluble arsenic increased to about 20 times its original value, on similar exposure. With other batches, as noted hereinabove, even better results have been obtained. Instead of calcium fluoride in the described process, hydrofluoric acid, hydrofluosilicic acid, sodium fluoride, sodium silico-fluoride, potassium fluoride, ammonium fluoride, or other like fluorides, may be used, to the amount of, say, 3 per cent of the weight of arsenic acid or corresponding ingredient.

In general, the product is a powder which for insecticidal use can be dusted on the plants to be protected; in some cases, where desired, the process can be carried out so that the arsenate is made up in a paste or like form for use, with any necessary dilution, as a spray. It will also be understood that other suitable plant-protective agents or the like may be included in the manufactured product, to any commercially desired extent.

It is believed that with the described process there is preferably no direct chemical combination of fluorine and arsenate into a single compound, especially so far as the production of such compound might impair the insecticidal activity of the arsenate, as by dilution of its arsenic potency or otherwise. On the other hand, success with the process has been attained where the fluoride and arsenate, for example, are at least intimately associated as explained, and according to present theory or understanding of the product, such association is of the nature of a mutual adsorption of fluoride and arsenate particles. Investigation of certain batches of the resulting product reveals, for instance, that the relation of component particles is preferably more nearly that of a fine dispersion than a relatively coarse indiscriminate mixture, the component particles having an apparent tendency to coat each other, or to intermix with considerable cohesiveness. In such cases, the final product thus apparently contains a dispersed system of arsenate and fluoride particles, and although such structure may not be thoroughly understood at present, it is thought that the term "mutual adsorption" will, in the light of the above, serve to define the relation thus attained.

It is to be understood that invention is not limited to the specific procedure herein specifically described, but may be carried out in other ways without departing from its spirit as defined by the following claims:

I claim:

1. A method of making calcium arsenate products of the class described wherein the calcium arsenate is produced by a chemical reaction in water, including carrying out said reaction in the presence of a flourine compound introduced prior to completion of said reaction.

2. In a method of making calcium arsenate products of the class described wherein the calcium arsenate is produced by a reaction of a plurality of substances in water, the step of mixing a fluorine compound with one of said substances prior to carrying out said reaction.

3. In a method of making calcium arsenate products of the class described wherein the calcium arsenate is produced by a chemical reaction, procedure for incorporating into the calcium arsenate a free fluorine compound in intimate association therewith characteristic of a mutual adsorption of arsenate and the fluorine compound, including the step of carrying out the aforesaid reaction in the presence of a fluorine compound introduced prior to completion of said reaction.

4. In a method of making calcium arsenate products of the class described wherein calcium arsenate is produced by a reaction involving arsenic acid, the step of mixing a fluorine compound with the arsenic acid prior to carrying out said reaction.

5. In a method of making calcium arsenate products of the class described wherein calcium arsenate is produced by a reaction of substances including arsenic acid and lime, the step of introducing a fluorine compound with said reacting substances not later than the carrying out of said reaction.

6. A method of stabilizing calcium arsenate products of the class described against deteriorating influences tending to liberate soluble arsenic, wherein the calcium arsenate is produced by the reaction of arsenic acid and lime, including carrying out said recation in the presence of a fluorine compound introduced prior to completion of said reaction.

7. A method of making calcium arsenate products of the class described, comprising mixing arsenic acid with a fluorine compound and water in the presence of heat, and adding lime with the temperature controlled to about 75° C., for reaction with the arsenic acid in the presence of the fluorine compound, to produce calcium arsenate stabilized against deteriorating influences tending to liberate soluble arsenic.

JOHNSON HAGOOD.